United States Patent
Jo et al.

(10) Patent No.: US 12,399,195 B2
(45) Date of Patent: Aug. 26, 2025

(54) METHOD FOR MEASURING, BY MEASUREMENT DEVICE, CHARACTERISTICS OF SURFACE OF OBJECT TO BE MEASURED, ATOMIC FORCE MICROSCOPE FOR PERFORMING SAME METHOD, AND COMPUTER PROGRAM STORED IN STORAGE MEDIUM TO PERFORM SAME METHOD

(71) Applicant: PARK SYSTEMS CORP., Suwon-si (KR)

(72) Inventors: Ahjin Jo, Seoul (KR); Seung Hun Baik, Seoul (KR); Seonghun Yun, Suwon-si (KR); Byoung-Woon Ahn, Anyang-si (KR); Sang-il Park, Seongnam-si (KR)

(73) Assignee: PARK SYSTEMS CORP., Suwon-si (KR)

( * ) Notice: Subject to any disclaimer, the term of this patent is extended or adjusted under 35 U.S.C. 154(b) by 381 days.

(21) Appl. No.: 18/026,814

(22) PCT Filed: Sep. 24, 2021

(86) PCT No.: PCT/KR2021/013064
§ 371 (c)(1),
(2) Date: Mar. 16, 2023

(87) PCT Pub. No.: WO2022/065928
PCT Pub. Date: Mar. 31, 2022

(65) Prior Publication Data
US 2023/0324433 A1    Oct. 12, 2023

(30) Foreign Application Priority Data

Sep. 24, 2020 (KR) .................. 10-2020-0123731
Sep. 23, 2021 (KR) .................. 10-2021-0125981

(51) Int. Cl.
*G01Q 60/38* (2010.01)
*G01Q 20/02* (2010.01)
*G01Q 70/10* (2010.01)

(52) U.S. Cl.
CPC ............. *G01Q 60/38* (2013.01); *G01Q 20/02* (2013.01); *G01Q 70/10* (2013.01)

(58) Field of Classification Search
CPC ......... G01Q 60/38; G01Q 20/02; G01Q 70/10
See application file for complete search history.

(56) References Cited

U.S. PATENT DOCUMENTS 3,599,093 A * 8/1971 Oates .................. G01R 1/07342
439/482
5,866,807 A * 2/1999 Elings ...................... G01N 3/46
977/852

(Continued)

FOREIGN PATENT DOCUMENTS

EP         2392930 A1    12/2011
JP      2003-227788 A     8/2003

(Continued)

OTHER PUBLICATIONS

Korean Notice of Allowance dated Jan. 23, 2024 issued on Application No. 10-2021-0125981.

(Continued)

*Primary Examiner* — Nicole M Ippolito
(74) *Attorney, Agent, or Firm* — Invenstone Patent LLC.

(57) ABSTRACT

The present invention relates to a method for measuring, by a measurement device, characteristics of a surface of an object to be measured. The method includes an approach step of positioning the tip to come into contact with a specific position of the surface of the object to be measured and a lift step of separating the contacted tip from the surface of the object are repeatedly performed with respect to a plurality of positions of the surface of the object. The tip is (Continued)

controlled to vibrate in a portion or the entirety of the approach step and the lift step, and a movement characteristic of the tip is controlled according to a change of the vibration characteristic of the tip.

11 Claims, 9 Drawing Sheets

(56) References Cited

U.S. PATENT DOCUMENTS

| | | |
|---|---|---|
| 2005/0242283 A1 | 11/2005 | Hasegawa et al. |
| 2006/0260388 A1 | 11/2006 | Su et al. |
| 2012/0030845 A1 | 2/2012 | Fukuma et al. |
| 2012/0079635 A1 | 3/2012 | Liu et al. |
| 2019/0056428 A1 | 2/2019 | Schwarz et al. |

FOREIGN PATENT DOCUMENTS

| | | |
|---|---|---|
| JP | 2004-132823 A | 4/2004 |
| JP | 2006-349537 A | 12/2006 |
| JP | 2008-232984 A | 10/2008 |
| JP | 2018-165690 A | 10/2018 |
| KR | 10-0523031 B1 | 10/2005 |
| KR | 10-0646441 B1 | 11/2006 |
| KR | 10-1468061 B1 | 12/2014 |
| KR | 10-1476808 B1 | 12/2014 |
| KR | 10-1607606 B1 | 3/2016 |
| KR | 10-2016-0049148 A | 5/2016 |
| KR | 10-2102637 B1 | 4/2020 |

OTHER PUBLICATIONS

European Search Report dated Sep. 26, 2024 issued on Application No. 21872956.4.

* cited by examiner

METHOD FOR MEASURING, BY MEASUREMENT DEVICE, CHARACTERISTICS OF SURFACE OF OBJECT TO BE MEASURED, ATOMIC FORCE MICROSCOPE FOR PERFORMING SAME METHOD, AND COMPUTER PROGRAM STORED IN STORAGE MEDIUM TO PERFORM SAME METHOD

CROSS-REFERENCE TO RELATED APPLICATIONS

This application is a National Stage filing under 35 U.S.C. 371 of International Application No. PCT/KR2021/013064, filed on Sep. 24, 2021, which claims the benefit of earlier filing date and right of priority to Korean Application No. 10-2020-0123731 filed on Sep. 24, 2020, and Korean Application No. 10-2021-0125981 filed on Sep. 23, 2021 in the Korean Intellectual Property Office, the contents of which are all hereby incorporated by reference herein in their entirety.

BACKGROUND OF THE DISCLOSURE

Technical Field

The present disclosure relates to a method for measuring, by a measurement device, characteristics of a surface of an object to be measured, an atomic force microscope for performing the same method, and a computer program stored in a storage medium to perform the same method, and more particularly, to a method for measuring, by a measurement device, characteristics of a surface of an object to be measured, which achieves a faster measurement speed and reduces wearing a tip and is suitable for measuring a deep and narrow trench structure, an atomic force microscope for performing the method, and a computer program stored in a storage medium to perform the method.

Background Art

A scanning probe microscope (SPM) refers to a microscope which scans a surface of a specimen with a fine tip (probe) manufactured by an MEMS process to measure characteristics of a surface of an object to be measured and displays a result as a 3D image. Such a scanning probe microscope is classified into an atomic force microscope (AFM) and a scanning tunneling microscope (STM), depending on a measurement method.

In the scanning probe microscope, generally, the tip scans the surface of the object to be measured while following the surface. Therefore, even though an interval between the tip and the surface of the object to be measured is controlled by means of the feedback, the collision between the tip and the surface of the object to be measured is inevitable, which causes the damage of the tip. In order to reduce the damage, there has been an attempt to measure a height of only a specific point to obtain a topography of a surface of the object to be measured by repeating the tip to approach the surface of the object to be measured, to lift by a predetermined height, to move to another position, and again to approach the surface of the object to be measured (see Patent Document 1).

In addition to the object for minimizing the damage of the tip, there also has been an attempt to utilize the above-described technique so as not to reflect a curve image of the surface of the object to be measured in an option signal such as EFM or MFM (see Patent Document 2). Such a technique is also referred to as a pinpoint mode.

In the meantime, in accordance with the miniaturization and the integration of the semiconductor, a narrow and deep trench structure has been created. In order to obtain a shape of the narrow and deep trench, the scanning probe microscope, such as an atomic force microscope, is utilized. Due to the characteristic of the narrow and deep shape, a tip which is longer than at least a height of the trench needs to be selected. Further, in order to minimize the interference with the side wall of the trench, the tip needs to be as thin as possible. Due to this restriction of the tip, it is very difficult to control the long tip to follow the surface of the narrow and deep trench.

Accordingly, in order to measure the narrow and deep trench shape, a pin point mode is utilized. However, in the operation of the pin point mode using a long tip, it takes excessive time to lift the tip, which may impede the throughput.

Patent Document 1

Japanese Laid-Open No. 2004-132823 (Title of Invention: Sampling scanning probe microscope and scanning method)

Patent Document 2

Korean Registered Patent No. 10-2102637 (Title of Invention: Method and apparatus for acquiring topography signal and option signal and atomic force microscope including the same).

SUMMARY OF THE DISCLOSURE

The present disclosure has been made an effort to solve the above-described problem. Objectives of the present disclosure are to provide a method for measuring, by a measurement device, characteristics of a surface of an object to be measured, which achieves a faster measurement speed and reduces wearing a tip and is suitable for measuring a deep and narrow trench structure, an atomic force microscope for performing the method, and a computer program stored in a storage medium to perform the method.

Objectives of the present disclosure are not limited to the above-mentioned objectives, and other objectives, which are not mentioned above, may be clearly understood by those skilled in the art from the following descriptions.

A method according to an embodiment of the present disclosure to solve the problem above is a method for measuring characteristics of a surface of an object to be measured, using a measurement device which measures characteristics of the surface of the object to be measured, by measuring an interaction between a tip and the surface of the object to be measured. In the present method, an approach step of positioning the tip to come into contact with a specific position of the surface of the object to be measured, and a lift step of separating the contacted tip from the surface of the object to be measured are repeatedly performed with respect to a plurality of positions of the surface of the object to be measured, the tip is controlled to vibrate in a portion or the entirety of the approach step and the lift step, and a movement characteristic of the tip is controlled according to a change of the vibration characteristic of the tip.

According to another feature of the present disclosure, the tip is controlled to freely vibrate and a vibration characteristic of the tip is an amplitude.

According to still another feature of the present disclosure, during the approach step, the tip is controlled to freely vibrate, and an approach speed of the tip with respect to the surface of the object to be measured is controlled by the change of the amplitude of the tip.

According to still another feature of the present disclosure, as the tip approaches the surface of the object to be measured while the approach step proceeds, the amplitude of the tip is reduced, and when the amplitude of the tip is detected to be equal to or smaller than an amplitude A which is smaller than an amplitude during the free vibration of the tip, the control depending on the change of the amplitude of the tip is turned off, and the tip is controlled to press the surface of the object to be measured with a specific force.

According to still another feature of the present disclosure, during the lift step, the tip is controlled to freely vibrate, and a lift height of the tip is controlled by the change of the amplitude of the tip.

According to still another feature of the present disclosure, as the tip moves away from the surface of the object to be measured while the lift step proceeds, the amplitude of the tip is increased, and when the amplitude of the tip is detected to be an amplitude which is smaller than the amplitude in the free vibration of the tip, the lift operation is controlled to be stopped.

According to still another feature of the present disclosure, the method further includes a shift step for positioning the tip on another position after completing the lift step in the specific position, before performing the approach step in another position, in which during the shift step, the tip is controlled to freely vibrate, and during the shift step, a movement path of the tip is controlled to make a vibration characteristic of the tip constant.

According to still another feature of the present disclosure, in the approach step, a contact mode control and a non-contact mode control of an atomic force microscope are performed in different periods, respectively.

According to still another feature of the present disclosure, in the lift step, a contact mode control and a non-contact mode control of an atomic force microscope are performed in different periods, respectively.

An atomic force microscope according to an embodiment of the present disclosure to solve the problem above is an atomic force microscope configured to measure a surface of an object to be measured using a probe unit including a tip and a cantilever. The atomic force microscope includes an XY scanner configured to move the object to be measured to allow the tip to relatively move in an XY direction with respect to the surface of the object to be measured; a head configured to mount the probe unit, and include an optical system which measures a vibration or a flexure of the cantilever, and a Z scanner configured to move the probe unit in the Z direction to control a distance between the tip and the surface of the object to be measured, based on data obtained by the optical system; and a controller which controls the XY scanner and the head. The controller repeatedly performs an approach step of positioning the tip to come into contact with a specific position of the surface of the object to be measured; and a lift step of separating the contacted tip from the surface of the object to be measured, with respect to a plurality of positions of the surface of the object to be measured. Further, the controller is configured to control the tip to vibrate in a portion or the entirety of the approach step and the lift step, and configured to control a movement characteristic of the tip according to the change of the vibration characteristic of the tip.

A computer program according to an embodiment of the present disclosure to solve the problem above is stored in a storage medium to perform the above-described method.

According to the method of the present disclosure, a pin point mode which can reduce wearing of the tip with a faster measurement speed and is suitable for measuring a deep and narrow trench structure is provided.

DETAILED DESCRIPTION OF THE DISCLOSURE

Advantages and characteristics of the present disclosure and a method of achieving the advantages and characteristics will be clear by referring to exemplary embodiments described below in detail together with the accompanying drawings. However, the present disclosure is not limited to exemplary embodiment disclosed herein but will be implemented in various forms. The exemplary embodiments are provided by way of example only so that a person of ordinary skilled in the art may fully understand the disclosures of the present disclosure and the scope of the present disclosure. Therefore, the present disclosure will be defined only by the scope of the appended claims.

Although the terms "first", "second", and the like are used for describing various components, these components are not confined by these terms. These terms are merely used for distinguishing one component from the other components. Therefore, a first component to be mentioned below may be a second component in a technical spirit of the present disclosure. Further, even though it is described that the second coating is performed after the first coating, the coating performed in a reverse order is also included in the technical spirit of the present disclosure.

When the reference numerals are used in the present specification, when even in different drawings, the same component is illustrated, the same reference numeral is used as much as possible.

A size and a thickness of each component illustrated in the drawing are illustrated for convenience of description, and the present disclosure is not limited to the size and the thickness of the component illustrated.

Configuration of Atomic Force Microscope for Carrying Out the Present Disclosure First, as a measurement device for performing the method of the present disclosure, a configuration of an atomic force microscope will be described as an example.

Figure 1:
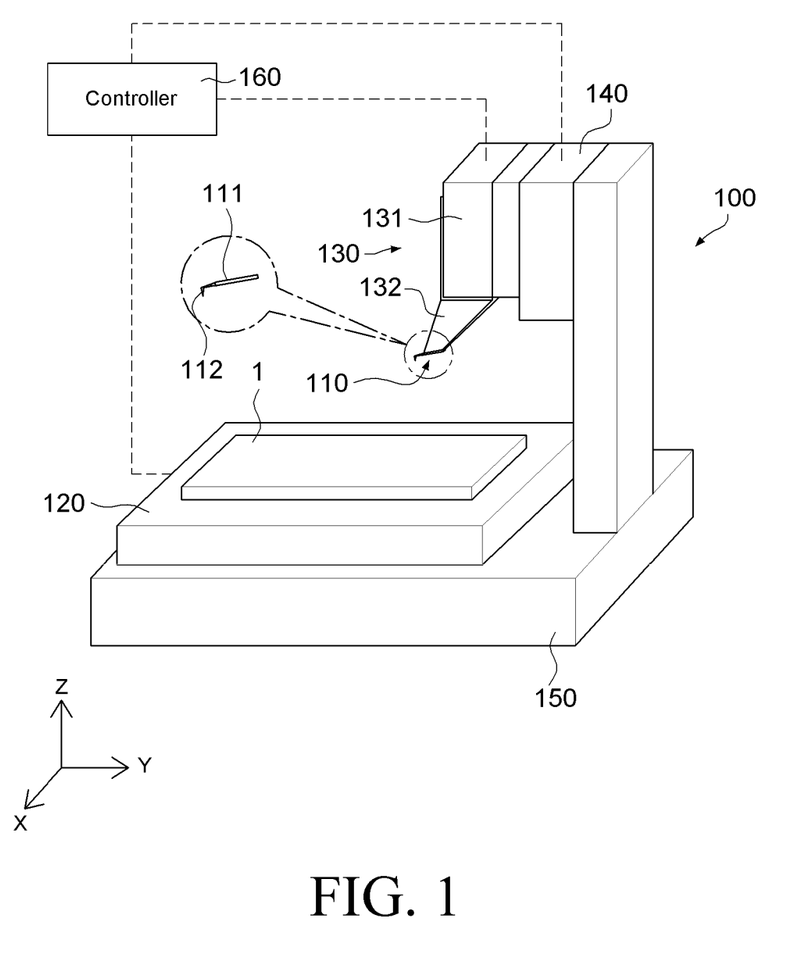
FIG. 1 is a schematic perspective view of an atomic force microscope in which an XT scanner and a Z scanner are separated according to an example embodiment.
Figure 2:
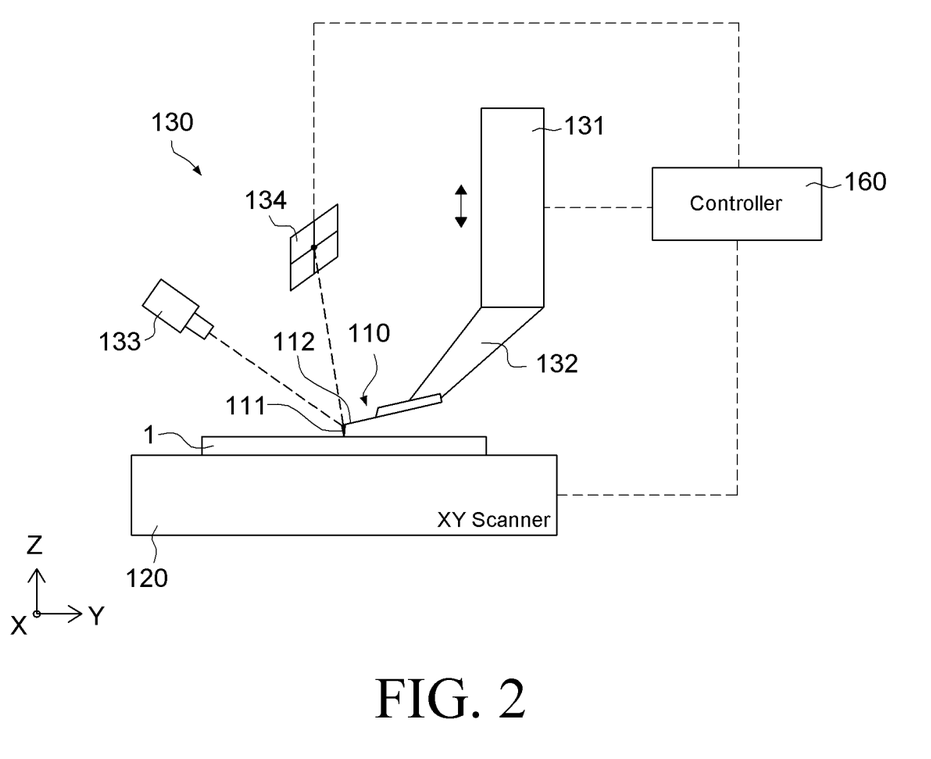
FIG. 2 is a conceptual view explaining a method for measuring an object to be measured using an optical system according to an example embodiment.

FIG. 1 is a schematic perspective view of an atomic force microscope in which an XT scanner and a Z scanner are separated, and FIG. 2 is a conceptual view explaining a method for measuring an object to be measured using an optical system according to an example embodiment.

Referring to FIG. 1, the atomic force microscope 100 is configured to include a probe unit 110, an XY scanner 120, a head 130, a Z stage 140, a fixing frame 150, and a controller 160.

The probe unit 110 includes a cantilever 111 and a tip 112 and is configured to allow the tip 112 to follow a surface of the object 1 to be measured in a contact or non-contact state. The probe unit 110 may be provided separately from the other following configurations and is used to be fixed to the head 130.

The XY scanner 120 is configured to move the object 1 to be measured to allow the tip 112 to relatively move in a first direction with respect to a surface of the object 1 to be measured. Specifically, the XY scanner 120 serves to scan the object 1 to be measured in an X direction and a Y direction on an XY plane.

The head 130 is configured such that the probe unit 110 is mounted thereto, and includes an optical system which measures a vibration or a flexure of the cantilever 111 and the Z scanner 131 configured to move the probe unit 110 at least in the second direction or an opposite direction to control a distance between the tip and a surface of the object to be measured based on data obtained by the optical system. The optical system will be described below with reference to FIG. 2. Here, the Z scanner 131 moves the probe unit 110 in a relatively small displacement.

The Z stage 140 moves the probe unit 110 and the head 130 with a relatively large displacement in the Z direction.

The fixing frame 150 fixes the XY scanner 120 and the Z stage 140.

The controller 160 is configured to control at least the XY scanner 120, the head 130, and the Z stage 140.

In the meantime, the atomic force microscope 110 may further include an XY stage (not illustrated) configured to move the XY scanner 120 on the XY plane with a large displacement. In this case, the XY stage is fixed to the fixing frame 150.

The atomic force microscope 100 scans the surface of the object 1 to be measured with the probe unit 110 to obtain an image such as a topography. The relative movement between the surface of the object 1 to be measured and the probe unit 110 may be performed by the XY scanner 120, and the Z scanner 131 may vertically move the probe unit 110 to follow the surface of the object 1 to be measured. In the meantime, the probe unit 110 and the Z scanner 131 are connected by a probe arm 132.

Referring to FIG. 2, the XY scanner 120 supports the object 1 to be measured and scans the object 1 to be measured in the XY direction. The XY scanner 120 may be driven by a piezoelectric actuator. When the XY scanner is separated from the Z scanner 131 as described in the exemplary embodiment, a stacked piezoelectric driver (staced piezo) may be used. Regarding the XY scanner 120, refer to Korean Patent Nos. 10-0523031 (entitled XY scanner in scanning probe microscope and method driving the same) and 10-1468061 (entitled Control method of scanner and scanner device using thereof) which are registered by the present applicant.

The Z scanner 131 is connected to the probe unit 110 to adjust a height of the probe unit 110. The Z scanner 131 may be also driven by the piezoelectric actuator, like the XY scanner 120. Regarding to the Z scanner 131, refer to Korean Registered Patent No. 10-1476808 (entitled Scanner apparatus and atomic force microscope including the same) which is registered by the present applicant. When the Z scanner 131 is contracted, the probe unit 110 moves away from the surface of the object 1 to be measured, and when the Z scanner 131 extends, the probe unit 110 is close to the surface of the object 1 to be measured.

As illustrated in FIGS. 1 and 2, the XY scanner 120 and the Z scanner 131 are separated to be provided as separate members, but may be integrated by a tube type piezoelectric actuator as one member. In the case of the tubular piezoelectric actuator, the movement in the XY direction and the movement in the Z direction may be performed together. However, there is a problem in that the behavior in the XY direction and the behavior in the Z direction are coupled such that an image may be distorted. However, despite this limitation, this structure may also be utilized in the present disclosure. Such an XYZ integrated scanner is disclosed in US Patent Application Publication No. 2012-0079635A1 (entitled Methods and devices for correcting errors in atomic force microscopy) and also other known structures of the atomic force microscope may be used.

The head 130 has an optical system which measures vibration or a flexure of the cantilever 111 of the probe unit 110, and the optical system includes a laser generation unit 132 and a detector 133.

The laser generation unit 132 irradiates laser light (illustrated with dotted line) onto a surface of the cantilever 111 of the probe unit 110, and laser light reflected from the surface of the cantilever 111 is focused on a biaxial detector 133, such as a position sensitive photo detector (PSPD). The signal detected by the detector 133 is sent to the controller 160 to be controlled.

The controller 160 is connected to the XY scanner 120 and the Z scanner 131 to control the driving of the XY scanner 120 and the Z scanner 131. Further, the controller 160 converts a signal obtained from the detector 133 into a digital signal by an ADC converter, and may determine a degree of flexure or warpage of the cantilever 111 of the probe unit 110 by utilizing the converted signal. A computer may be integrated with the controller 160 or a separate computer may be connected to the controller 160. The computer 160 is integrated as one to be put in a rack or may be divided into two or more parts.

The controller 160 transmits a signal which drives the XY scanner 120 to scan the object 1 to be measured by the XY scanner 120 in the XY direction, and controls the Z scanner 131 to allow the probe unit 110 to have a constant interactive force with the surface of the object 1 to be measured (that is, to maintain the cantilever 111 a constant degree of flexure, or to vibrate the cantilever 111 with a constant amplitude). That is, the controller 160 has a software or electric circuit closed loop feedback logic. Further, the controller 160 measures a length of the Z scanner 131 (or a length of an actuator used for the Z scanner 131) or measures a voltage which is applied to the actuator used for the Z scanner 131 to obtain shape data (topography) of the surface of the object 1 to be measured.

Here, the tip 112 of the probe unit 110 may relatively move with respect to the surface of the object 1 to be measured while being in contact with the surface of the object 1 to be measured (referred to as a "contact mode"), or relatively moves with respect to the surface of the object 1 to be measured in a state which is not in contact with the surface (referred to as a "non-contact mode"). Further, the tip 112 may relatively move with respect to the surface of the object 1 to be measured while vibrating and tapping the surface of the object 1 to be measured (referred to as a "tapping mode"). Such various modes correspond to a mode which has been developed in the related art so that a detailed description thereof will be omitted.

In the meantime, the controller 160 may obtain various data about the surface of the object 1 to be measured, as well as the shape data. For example, a specific treatment is performed to apply a magnetic force or a electrostatic force to the probe unit 110 to obtain data about the magnetic force or data about the electrostatic force of the surface of the object 1 to be measured. Modes of the atomic force microscope include a magnetic force microscopy (MFM) and an electrostatic force microscopy (EFM), which may be implemented using a known method. In addition, data about the surface of the object 1 to be measured may be a voltage of the surface or a current of the surface.

In the meantime, it should be noted that as a configuration of the head 130, for the convenience of description, only essential components have been described, but other specific configurations of the optical system are omitted. For example, the head 130 may further include components disclosed in Korean Registered Patent No. 10-0646441.

Method for Measuring Characteristics of Surface of Object to be Measured

An exemplary embodiment of a method for measuring characteristics of a surface of an object to be measured of the present disclosure will be described with reference to the accompanying drawings.

Figure 3:
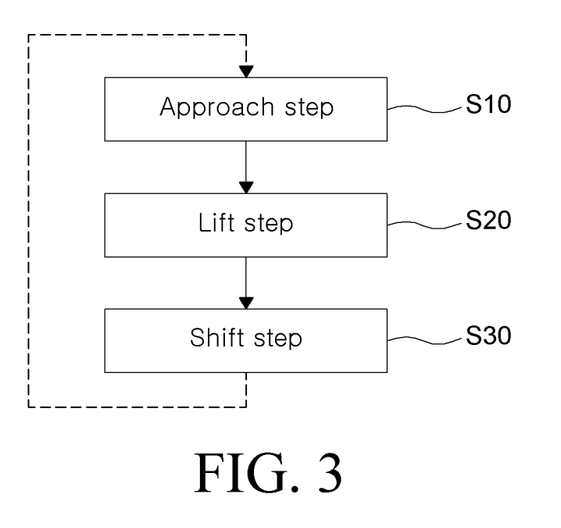
FIG. 3 is a schematic flowchart of a method for measuring characteristics of a surface of an object to be measured according to an example embodiment of the present disclosure.
Figure 4:
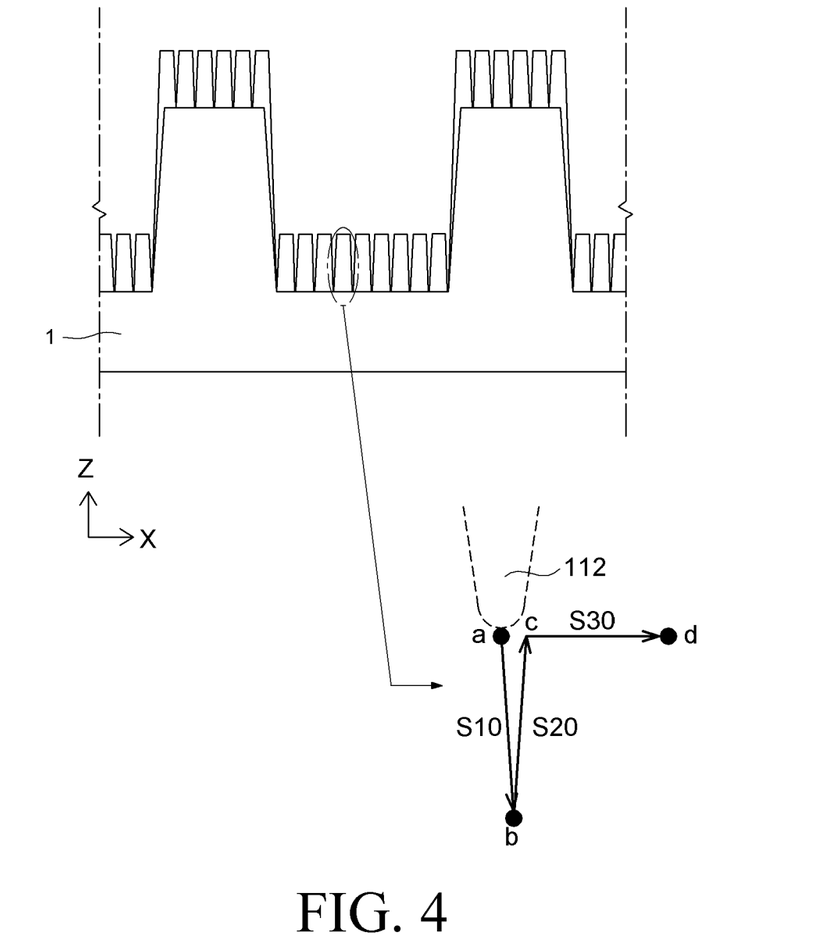
FIG. 4 is a conceptual view schematically illustrating a method for measuring characteristics of a surface of an object to be measured according to an example embodiment of the present disclosure.

FIG. 3 is a schematic flowchart of a method for measuring characteristics of a surface of an object to be measured, and FIG. 4 is a conceptual view schematically illustrating a method for measuring characteristics of a surface of an object to be measured according to an example embodiment of the present disclosure.

Referring to FIG. 3, the method for measuring characteristics of a surface of an object to be measured of the present disclosure is performed by a measurement device, such as an atomic force microscope 100 illustrated in FIGS. 1 and 2 which measures characteristics of the object to be measured by measuring interaction between a tip and a surface of the object to be measured, and the method includes an approach step S10, a lift step S20, and a shift step S30. Hereinafter, the method of the present disclosure will be described also with reference to FIGS. 1 and 2.

First, the tip 112 is positioned to come into contact with a specific position (a first position) of a surface of an object to be measured in the approach step S10.

Referring to FIG. 4, in the step S10, the measurement device performs an operation of sending an end of the tip positioned in a location a to a location b (the first position) to be in contact therewith. The location a is an arbitrary position and may be a position of the end of the tip 112 after completing the previous shift step S30. The position (the first position) of the tip 112 after the approach is an arbitrary location to be measured.

The approach step S10 is performed to allow the tip 112 to approach the surface of the object 1 to be measured using the Z scanner 131. The approach step S10 is completed by allowing the end of the tip 112 to press the surface of the object 1 to be measured with a specific force. When the end of the tip 112 is pressed with a specific force, the cantilever 111 is bent, and the bending of the cantilever 111 is sensed by an optical system including a laser generation unit 133 and the detector 134. When the cantilever 111 is bent by a predetermined degree, the approach step S10 is completed and data about the position of the end of the tip 112 is collected. The data may be obtained from the Z scanner 131, or a length sensor (for example, a strain gauge sensor) attached to the Z scanner 131. In addition, a specific control method in the approach step S10 will be described below.

After the approach step S10 is completed, when the above-described data is obtained, the contacted tip 112 is spaced apart from the surface of the object to be measured in the lift step S20.

Referring to FIG. 4, in the present step S20, the measurement device lifts the end of the tip 112 positioned in the location b to a location c. For reference, the location c may be equal to the location a, or may not be equal as illustrated in FIG. 4. If the Z scanner 131 which moves the tip 112 in the Z direction implements a complete directivity, locations a and c match, and a path of the tip 112 by the approach step S10 may overlap the path of the tip 112 by the lift step S20.

The tip 112 lifted by the lift step S20 is controlled to be positioned on the other position (a second position) different from the first position to collect data in the other location in the shift step S30.

Referring to FIG. 4, in the step S30, the measurement device moves the end of the tip positioned in the location c to a location d positioned above the second position. The movement of the tip 112 may be implemented by moving the tip 112, but may also be implemented by moving the object 1 to be measured 1 using the XY scanner 120. According to the measurement device illustrated in FIGS. 1 and 2, the XY scanner 120 is controlled to move the object 1 to be measured to perform the shift step S30.

As illustrated in FIG. 4, the shift step S30 may be implemented to move the tip 112 to be parallel to the X direction, but may also have any path if it is possible to move onto another planned position.

Further, the shift step S30 is included in the lift step S20 so as not to be performed as a separate step. When the lift step S20 is performed, the tip 112 is horizontally moved while being lifted so that the lift step S20 may be omitted.

The approach step S10, the lift step S20, and the shift step S30 are repeatedly performed on the plurality of positions of the surface of the object 1 to be measured to measure characteristics of the object 1 to be measured. Here, the characteristics of the object 1 to be measured may be a topography of the surface of the object 1 to be measured. In addition, a specific characteristic (a magnetic property and an electric property) is applied to the tip 1 to obtain information other than the topography.

As illustrated in FIG. 4, data which may be obtained in a typical contact mode or non-contact mode may be obtained by repeating the above-described steps S10, S20, and S30 on the plurality of positions of the surface of the object 1 to be measured along the X direction. Specifically, in the measurement of the deep and narrow trench structure illustrated in FIG. 4, very difficult feedback condition needs to be found out for the tip 112 to follow the surface of the object 1 to be measured in a contact mode or a non-contact mode of the related art. When the feedback condition is not satisfied, the tip 112 collides with the object 1 to be measured so that an inferior image is obtained, and the tip 112 needs to be frequently replaced. To the contrary, when the method according to the present disclosure is utilized, even in the measurement of the deep and narrow trench structure, an excellent image may be obtained while minimizing a damage of the tip 112.

In the deep and narrow trench structure, in the non-contact mode of the related art, the tip 112 interacts with a side wall before interacting with a bottom of the trench so that the tip 112 does not deeply enter into the trench so that the measurement became difficult. To this end, a long tip 112 needs to be used. However, when the method of the present disclosure is performed using the long tip 112, it was common to pull the tip 112 completely out of the trench. However, there is a drawback in that the measurement time is increased. However, the characteristic to be described below compensates for the above-mentioned drawback.

Figure 5:
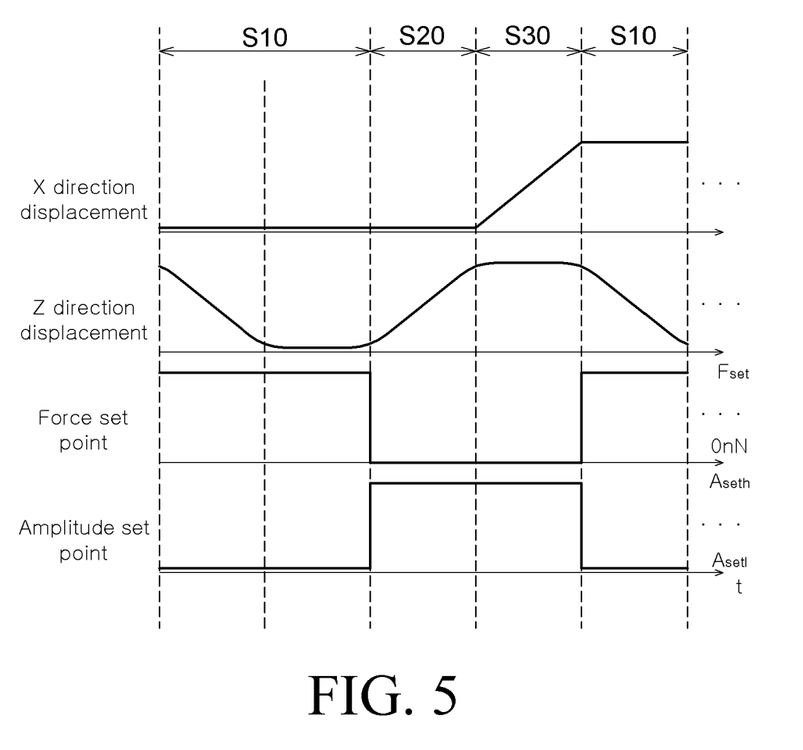
FIG. 5 is a graph time-sequentially illustrating a control method by performing steps of FIG. 4 according to an example embodiment.
Figure 6:
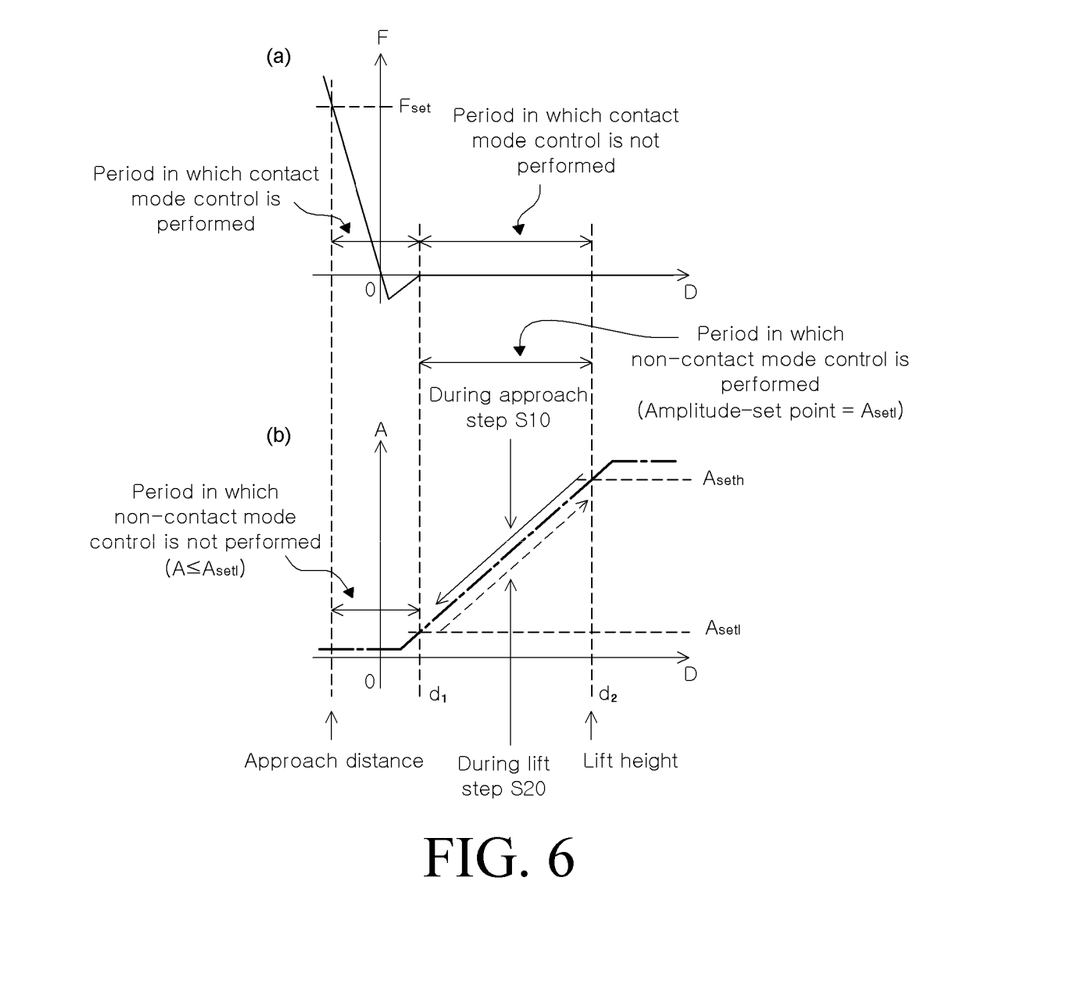
FIG. 6 illustrates an F-D curve and an A-D curve in an approach step according to an example embodiment.
Figure 7:
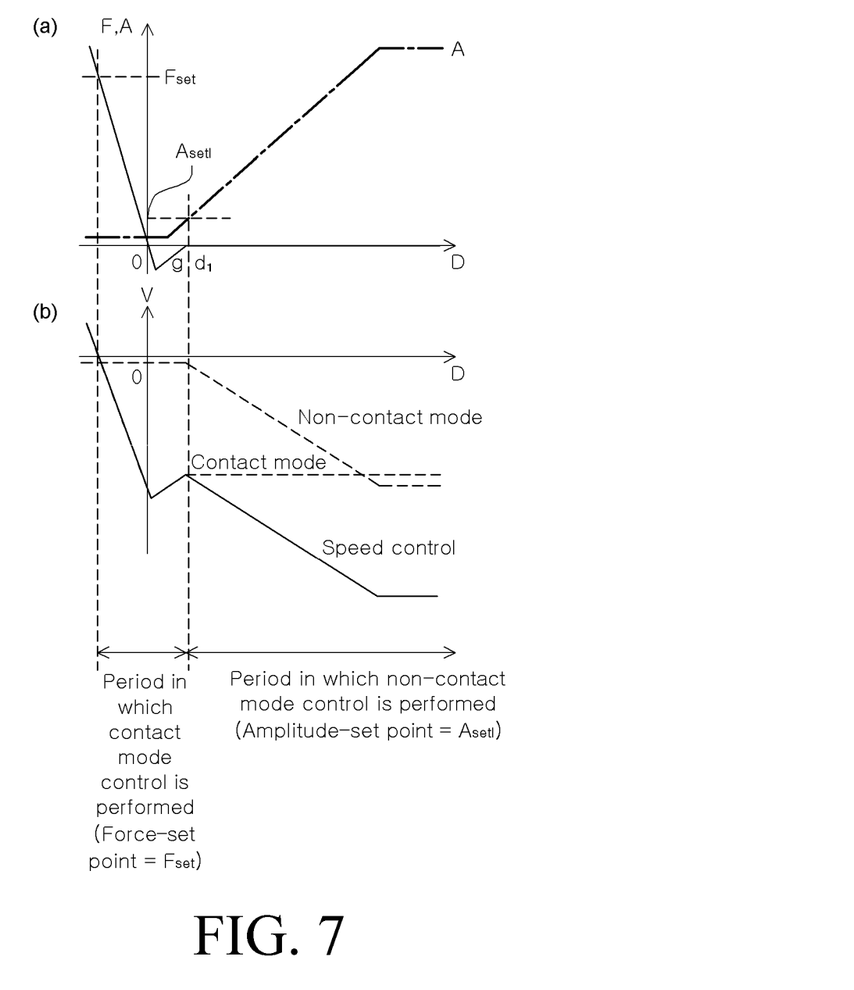
FIG. 7 illustrates a composite curve of an F-D curve and an A-D curve of FIG. and a V-D relationship thereby according to an example embodiment.
Figure 8:
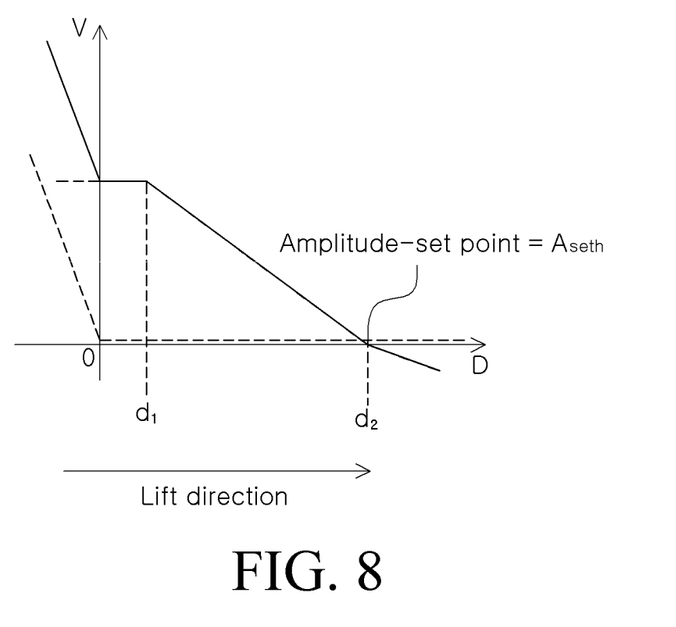
FIG. 8 illustrates a V-D relationship in a lift step according to an example embodiment.
Figure 9:
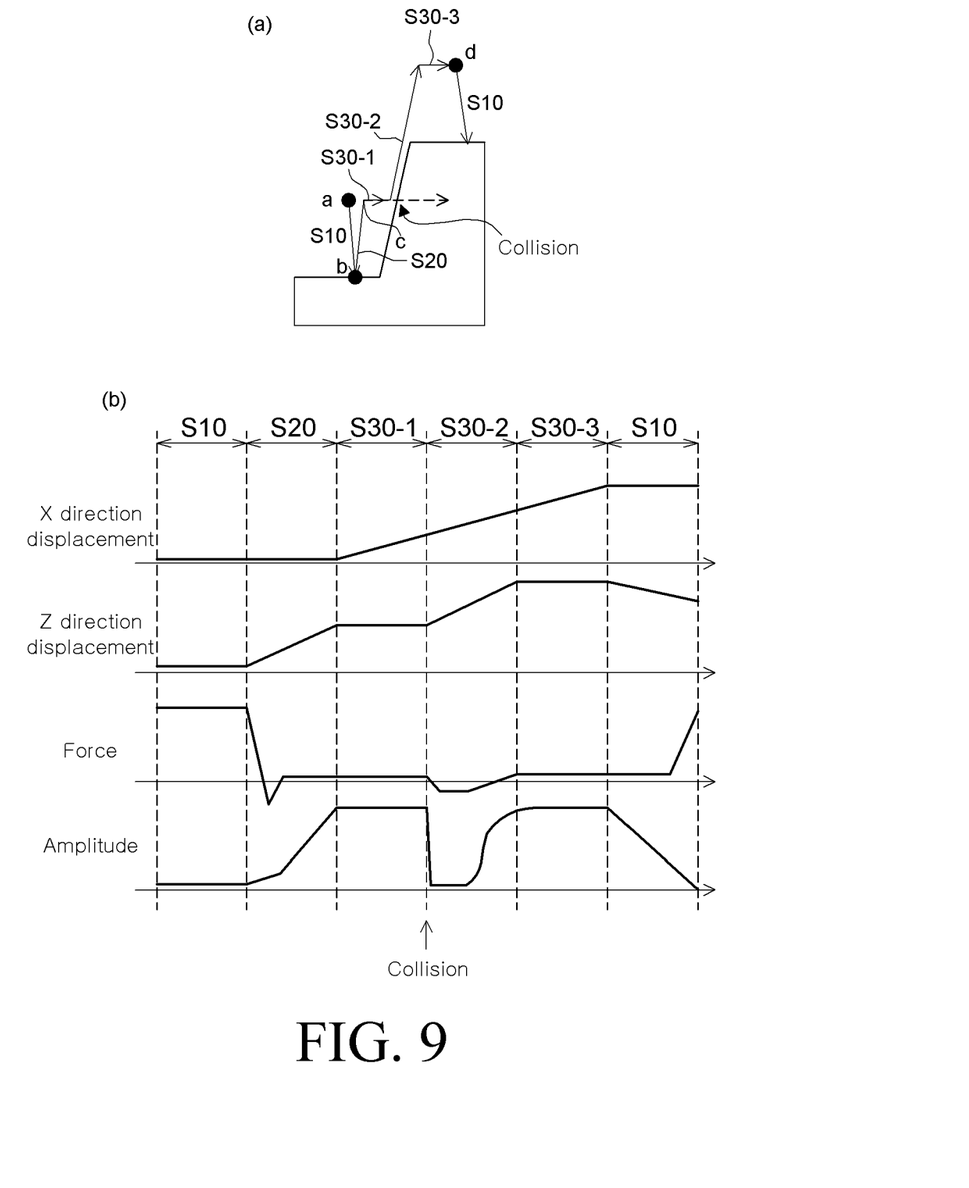
FIG. 9 is a graph time-sequentially illustrating a control method when an abnormal situation occurs in a shift step according to an example embodiment.

FIG. 5 is a graph time-sequentially illustrating a control method by performing steps of FIG. 4, FIG. 6 illustrates an F-D curve and an A-D curve in an approach step, FIG. 7 illustrates a composite curve of an F-D curve and an A-D curve of FIG. 6 and a V-D relationship thereby, FIG. 8 illustrates a V-D relationship in a lift step, and FIG. 9 is a graph time-sequentially illustrating a control method when an abnormal situation occurs in a shift step according to an embodiment.

Referring to FIG. 5, the approach step S10, the lift step S20, and the shift step S30 are sequentially performed, and a force set point and an amplitude set point are set to control the contact mode and the non-contact mode together.

A specific control method in the approach step S10 will be described with reference to FIGS. 5 to 7.

In the approach step S10, the tip 112 is controlled to vibrate at a specific frequency f. Here, the specific frequency may be a resonant frequency of the cantilever 111. The tip 112 freely vibrates and has a free vibration amplitude $A_{free}$.

When the step S10 is completed, the tip 112 vibrates, but the tip 112 is controlled to be in contact with the surface of the object 1 to be measured. That is, the approach is performed in the contact mode, but the control is performed in the approach step S10 even in the non-contact mode.

In FIG. 6A, a graph (an F-D curve) representing a relationship of a distance D between the end of the tip 112 and a surface of the object 1 to be measured in the contact mode and a pressing force F is illustrated. The end of the tip 112 is hardly affected by the force when it is far from the object 1 to be measured. When the end of the tip 112 is very close to the object 1 to be measured, the end of the tip 112 is attached to the surface of the object 1 to be measured, and when the end is closer thereto, the tip 112 presses the object 1 to be measured and the force may be continuously increased.

In FIG. 6B, a graph (an A-D curve) representing a relationship of an amplitude A of the tip 112 in the non-contact mode and a distance D between the end of the tip 112 and the surface of the object 1 to be measured is illustrated. The shorter the distance by the interaction with the surface of the object 1 to be measured, the smaller the amplitude of the tip 112. When the tip 112 is in contact with the object 1 to be measured, the amplitude is reduced to be close to 0 due to the physical confinement.

Using a behavior characteristic of the tip 112 in the contact mode and the non-contact mode of FIG. 6, an operation of the tip 112 which approaches the surface of the object 1 to be measured is controlled as illustrated in FIG. 7.

In FIG. 7A, the F-D curve and the A-D curve of FIG. 6 are composed to represent on the Y axis by composing the force F and the amplitude A at a predetermined ratio. By doing this, the approach speed control method as illustrated in FIG. 7B is determined.

First, in the approach step S10, the control according to the contact mode is not operated until the tip 112 and the object 1 to be measured 1 approach within a specific distance $d_1$, only the control according to the non-contact mode is operated.

Even though the specific distance $d_1$ may be arbitrarily determined, the distance $d_1$ is desirable to be equal to or slightly larger than a location g in which the end of the tip 112 is attached to the surface of the object 1 to be measured. The amplitude set point $A_{set1}$ which is an amplitude of the tip 112 in the specific distance $d_1$ may be determined according to a type of the cantilever 111 with the tip 112 hanging thereto. For example, the amplitude set point $A_{set1}$ may be represented by a ratio with respect to $A_{free}$, and for example, may be 5%, 10%, or 15%.

The control according to the non-contact mode performed until the tip 112 and the object 1 to be measured approach by a specific distance $d_1$ is a control of an approach speed V with an amplitude A. That is, as illustrated in FIG. 7B, the approach speed V is controlled to be reduced in proportion to the decrease of the amplitude A.

When the amplitude reaches the amplitude set point $A_{set1}$, the control according to the non-contact mode ends, and the control according to the contact mode is performed. That is, the approach speed V is controlled in accordance with a force (pressing force) of the tip 112 pressing the surface of the object 1 to be measured. As a result, the approach speed V is controlled to allow the tip 112 to press the surface of the object 1 to be measured at the force set point $F_{set}$.

Here, the force set point $F_{set}$ may be appropriately determined according to a characteristic of the probe unit 110, a surface characteristic of the object 1 to be measured, and a structure characteristic of the object 1 to be measured, and for example, may be several to several tens of nN.

In other words, as the approach step S10 is performed, the tip 112 approaches the surface of the object 1 to be measured so that the amplitude of the tip 112 is reduced. Thereafter, when the amplitude of the tip 112 which is equal to or smaller than the amplitude $A_{set1}$ which is smaller than the amplitude at the free vibration of the tip is detected, the control (non-contact mode control) depending on the change of the amplitude of the tip 112 is turned off, and the control (contact mode control) which controls the tip 112 to press the surface of the object 1 to be measured with a specific force is performed.

Referring to FIG. 5 again, when the approach step S10 is performed, the force set point is set to $F_{set}$ and the amplitude set point is set to $A_{set1}$. The set points allow performing the contact mode control and the non-contact mode control in different periods.

When the approach is performed as described above, the approach may be quickly performed, and as the end of the tip 112 is close to the surface of the object 1 to be measured, the approach speed is reduced to reduce an impulse between the end of the tip 112 and the surface of the object 1 to be measured so that the tip 112 may be used for a longer time.

Referring to FIG. 8, in the lift step S20, the tip 112 is controlled to be distant from the surface of the object 1 to be measured at a high speed in an initial stage, and when the distance therebetween is larger than $d_1$, the speed may be controlled in the non-contact mode control. As the amplitude of the tip 112 is increased, the speed is controlled to be low, and the lift height is limited so that the amplitude is not increased beyond a predetermined value.

In other words, the amplitude set point $A_{seth}$ is set. When the lift step S20 is completed, the distance between the end of the tip 112 and the surface of the object 1 to be measured is controlled to maintain the amplitude set point $A_{seth}$. A distance $d_2$ when the amplitude A is $A_{seth}$ may be referred to as a lifted height.

The amplitude set point $A_{seth}$ may be set to various values which are larger than $A_{set1}$, and for example, may be a value which is 50 to 95% of the maximum amplitude $A_{free}$. The amplitude set point $A_{seth}$ is related to the lifted height $d_2$ so that the amplitude set point $A_{seth}$ is set depending on how high the lifted height is set.

At this time, in the non-contact mode control, a gain value is desirably maintained to be low. This is because in the lift step S20, the lifting operation is important, but sensitive control is not important.

In other words, as the tip 112 moves away from the surface of the object 1 to be measured while the lift step S20 proceeds, the amplitude of the tip 112 is increased, and when the amplitude of the tip 112 is detected to be an amplitude $A_{seth}$ which is smaller than the amplitude in the free vibration of the tip 112, the lift operation is controlled to be stopped.

Referring to FIG. 5 again, in the step S20, the force set point is set to 0 or a value close to 0, and the amplitude set point is set to the maximum value $A_{seth}$ to control the speed and the height of the lift.

According to the present disclosure, in the lift step S20, the non-contact mode control is utilized to perform the pin-point mode by setting a minimum lift height. That is, in the pin point mode of the related art, an approach in the other position is performed after sufficiently lifting the tip 112, but according to the method of the present disclosure, even though the lift speed is increased, the lift height is drastically reduced to increase the measurement speed.

Referring to FIG. 5, the shift step S30 is performed by generating displacement in the X direction (or Y direction) while maintaining the lifted Z direction displacement. During the shift step S30, same to the lift step S20, the force set point is set to 0 or close to 0, and the amplitude set point is set to $A_{seth}$. FIG. 5 illustrates that when the tip 112 moves, any obstacle is not detected, and the displacement in the X direction is constantly changed, but the displacement in the Z direction is maintained.

However, during the shift step S30, the tip 113 may not move in the X direction due to the obstacle (for example, the side wall in FIG. 9A). This event may frequently occur in the measurement of the deep and narrow trench structure.

Referring to FIG. 9, in the shift step S30, in an initial period (S30-1), the tip moves only in the X direction without changing the displacement in the Z direction. When the tip 112 collides with the side wall, the amplitude A is reduced and as illustrated in FIG. 5, and the control is again performed to set the amplitude set point $A_{seth}$. In order to increase the amplitude of the tip 112, the tip 112 is lifted. At this time, the movement of the tip 112 in the X direction is continuously performed. That is, even though in the period S30-2, it is measured that the amplitude is reduced. However, due to the change in the Z direction displacement of the tip 112, in the period S30-3, the amplitude is controlled to $A_{seth}$ again.

For reference, the collision may be confirmed by the change of the pressing force. Referring to FIG. 9B, the pressing force has a negative value at the time of collision so that it is understood that the tip 112 presses the object 1 to be measured.

That is, when the shift step S30 is performed, the distance between the tip and the surface of the object 1 to be measured is maintained by utilizing the non-contact mode control so that an operation of excessively lifting the tip 112 is omitted to drastically reduce the measurement time.

In other words, during the shift step S30, the movement path of the tip 112 is controlled to make the vibration characteristic (for example, an amplitude) of the tip constant.

As described above, the movement characteristic of the tip 112 is controlled according to the change of the vibration characteristic of the tip 112. Here, the movement characteristic may be an approach speed of the tip 112, or a lifted height of the tip 112, as described above.

As the vibration characteristic of the tip 112, in the present exemplary embodiment, only the amplitude is exemplified, but this is just an example and a characteristic related to the vibration of the tip 112, such as a frequency or a phase is included.

The exemplary embodiments of the present disclosure have been described with reference to the accompanying drawings, but those skilled in the art will understand that the present disclosure may be implemented in another specific form without changing the technical spirit or an essential feature thereof. Thus, it is to be appreciated that the embodiments described above are intended to be illustrative in every sense, and not restrictive.

What is claimed is:

1. A method for measuring characteristics of a surface of an object to be measured, using a measurement device which measures characteristics of the surface of the object to be measured, by measuring an interaction between a tip and the surface of the object to be measured, the method comprising:
    an approach step of positioning the tip to come into contact with a specific position of the surface of the object to be measured; and
    a lift step of separating the contacted tip from the surface of the object to be measured, wherein
    the approach step and the lift step are repeatedly performed with respect to a plurality of positions of the surface of the object to be measured,
    the tip is controlled to vibrate in a portion or the entirety of the approach step and the lift step, and
    a movement characteristic of the tip is controlled according to a change of a vibration characteristic of the tip.

2. The method for measuring characteristics of a surface of an object to be measured of claim 1, wherein the tip is controlled to freely vibrate and a vibration characteristic of the tip is an amplitude.

3. The method for measuring characteristics of a surface of an object to be measured of claim 2, wherein during the approach step, the tip is controlled to freely vibrate, and an approach speed of the tip with respect to the surface of the object to be measured is controlled by the change of the amplitude of the tip.

4. The method for measuring characteristics of a surface of an object to be measured of claim 3, wherein as the tip approaches the surface of the object to be measured while the approach step proceeds, the amplitude of the tip is reduced, and when the amplitude of the tip is detected to be equal to or smaller than an amplitude A which is smaller than an amplitude during the free vibration of the tip, the control depending on the change of the amplitude of the tip is turned off, and the tip is controlled to press the surface of the object to be measured with a specific force.

5. The method for measuring characteristics of a surface of an object to be measured of claim 2, wherein during the lift step, the tip is controlled to freely vibrate, and a lift height of the tip is controlled by the change of the amplitude of the tip.

6. The method for measuring characteristics of a surface of an object to be measured of claim 5, wherein as the tip moves away from the surface of the object to be measured while the lift step proceeds, the amplitude of the tip is increased, and when the amplitude of the tip is detected to be an amplitude which is smaller than the amplitude in the free vibration of the tip, the lift operation is controlled to be stopped.

7. The method for measuring characteristics of a surface of an object to be measured of claim 2, further comprising:
a shift step for positioning the tip on another position after completing the lift step in the specific position, before performing the approach step in another position,
wherein during the shift step, the tip is controlled to freely vibrate, and during the shift step, a movement path of the tip is controlled to make a vibration characteristic of the tip constant.

8. The method for measuring characteristics of a surface of an object to be measured of claim 2, wherein in the approach step, a contact mode control and a non-contact mode control of an atomic force microscope are performed in different periods, respectively.

9. The method for measuring characteristics of a surface of an object to be measured of claim 2, wherein in the lift step, a contact mode control and a non-contact mode control of an atomic force microscope are performed in different periods, respectively.

10. An atomic force microscope configured to measure a surface of an object to be measured using a probe unit including a tip and a cantilever, the microscope comprising:
an XY scanner configured to move the object to be measured to allow the tip to relatively move in an XY direction with respect to the surface of the object to be measured;
a head configured to mount the probe unit, and include an optical system which measures a vibration or a flexure of the cantilever, and a Z scanner configured to move the probe unit in the Z direction to control a distance between the tip and the surface of the object to be measured, based on data obtained by the optical system; and
a controller which controls the XY scanner and the head, wherein the controller repeatedly performs an approach step of positioning the tip to come into contact with a specific position of the surface of the object to be measured; and a lift step of separating the contacted tip from the surface of the object to be measured, with respect to a plurality of positions of the surface of the object to be measured, and the controller is configured to control the tip to vibrate in a portion or the entirety of the approach step and the lift step, and configured to control a movement characteristic of the tip according to the change of the vibration characteristic of the tip.

11. A computer program stored in a storage medium to perform the method of claim 1.

* * * * *